(12) United States Patent
Loebe et al.

(10) Patent No.: US 9,801,342 B2
(45) Date of Patent: Oct. 31, 2017

(54) METHOD FOR DETERMINING THE SHARPNESS OF CUTTING EDGES OF CHOPPER BLADES

(75) Inventors: Stefan Loebe, Bad Saulgau (DE); Klaus Schulze, Neustadt (DE); Hans Rauch, Bad Saulgau (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 852 days.

(21) Appl. No.: 13/465,377

(22) Filed: May 7, 2012

(65) Prior Publication Data

US 2012/0293157 A1 Nov. 22, 2012

(30) Foreign Application Priority Data

May 21, 2011 (DE) .......................... 10 2011 102 172
Nov. 30, 2011 (DE) .......................... 10 2011 055 851

(51) Int. Cl.
| | | |
|---|---|---|
| *G01N 27/00* | (2006.01) | |
| *A01D 43/08* | (2006.01) | |
| *A01F 29/22* | (2006.01) | |
| *B24B 3/36* | (2006.01) | |
| *B24B 3/55* | (2006.01) | |

(52) U.S. Cl.
CPC .......... *A01D 43/085* (2013.01); *A01F 29/22* (2013.01); *B24B 3/363* (2013.01); *B24B 3/368* (2013.01); *B24B 3/55* (2013.01)

(58) Field of Classification Search
CPC ................................ B24B 15/00; A01D 75/08
USPC .......... 324/71.1, 76.19, 76.33, 77.11; 56/250
See application file for complete search history.

(56) References Cited

U.S. PATENT DOCUMENTS

| | | | | | |
|---|---|---|---|---|---|
| 3,635,271 A | * | 1/1972 | Markham | ............ | A01F 29/095 241/101.762 |
| 3,912,434 A | * | 10/1975 | Nagahara | ................ | B29B 9/065 241/259.1 |
| 4,471,673 A | * | 9/1984 | Rosenquist | ............ | B23D 63/14 76/41 |
| 4,509,297 A | * | 4/1985 | Lindgren | ............... | A63C 11/06 451/461 |
| 4,527,382 A | * | 7/1985 | Aono | ..................... | A01D 34/73 30/347 |
| 4,642,557 A | * | 2/1987 | Ross | ...................... | G01N 17/00 324/425 |
| 4,783,583 A | * | 11/1988 | Obara | ..................... | B23H 7/10 204/206 |
| 4,834,303 A | * | 5/1989 | McClure et al. | .......... | 241/101.2 |
| 4,908,931 A | * | 3/1990 | Itoh | .................... | H05K 13/0473 29/566.3 |
| 4,991,476 A | * | 2/1991 | Chow et al. | ...................... | 83/13 |

(Continued)

FOREIGN PATENT DOCUMENTS

| | | |
|---|---|---|
| DE | 286 737 | 2/1991 |
| DE | 40 23 113 | 6/1991 |

(Continued)

*Primary Examiner* — Giovanni Astacio-Oquendo
(74) *Attorney, Agent, or Firm* — Michael J. Striker

(57) ABSTRACT

A method for determining the sharpness of cutting edges (16) of chopper blades (1) at a rotationally driven chopper drum (14) of a forage harvester includes scanning a blade surface of at least one of the chopper blades located behind the cutting edge by at least one electrode operating as a contact sensor and determining a duration of contact of the at least one electrode with the blade surface.

14 Claims, 9 Drawing Sheets

(56) References Cited

U.S. PATENT DOCUMENTS

| | | | | |
|---|---|---|---|---|
| 5,329,754 | A * | 7/1994 | Fuesz | A01D 34/8355 56/504 |
| 5,660,579 | A * | 8/1997 | Nakayama | B24D 18/00 125/11.01 |
| 5,743,073 | A * | 4/1998 | Paquet | 56/12.1 |
| 6,430,909 | B1 * | 8/2002 | Clauss | 56/250 |
| 6,503,135 | B2 * | 1/2003 | Clauss et al. | 451/419 |
| 6,978,532 | B1 * | 12/2005 | Merritt | B23P 15/40 29/417 |
| 7,024,924 | B2 * | 4/2006 | Heinrich et al. | 73/104 |
| 7,533,516 | B2 * | 5/2009 | Pollklas et al. | 56/250 |
| 7,973,654 | B2 * | 7/2011 | Ehrhart et al. | 340/441 |
| 2005/0072135 | A1 * | 4/2005 | Kormann | 56/500 |
| 2009/0262460 | A1 * | 10/2009 | Hanchi et al. | 360/235.4 |
| 2010/0126258 | A1 | 5/2010 | Beck et al. | |
| 2010/0178855 | A1 * | 7/2010 | Fukui | B24B 19/16 451/180 |
| 2011/0078909 | A1 * | 4/2011 | Lambert | B23K 9/044 30/350 |

FOREIGN PATENT DOCUMENTS

| | | |
|---|---|---|
| DE | 199 03 153 | 3/2000 |
| DE | 10 2009 029 675 | 5/2010 |
| EP | 1 034 892 | 9/2000 |
| EP | 2 329 705 | 6/2011 |
| GB | 2 234 823 | 2/1991 |
| GB | 2 235 118 | 2/1991 |

\* cited by examiner

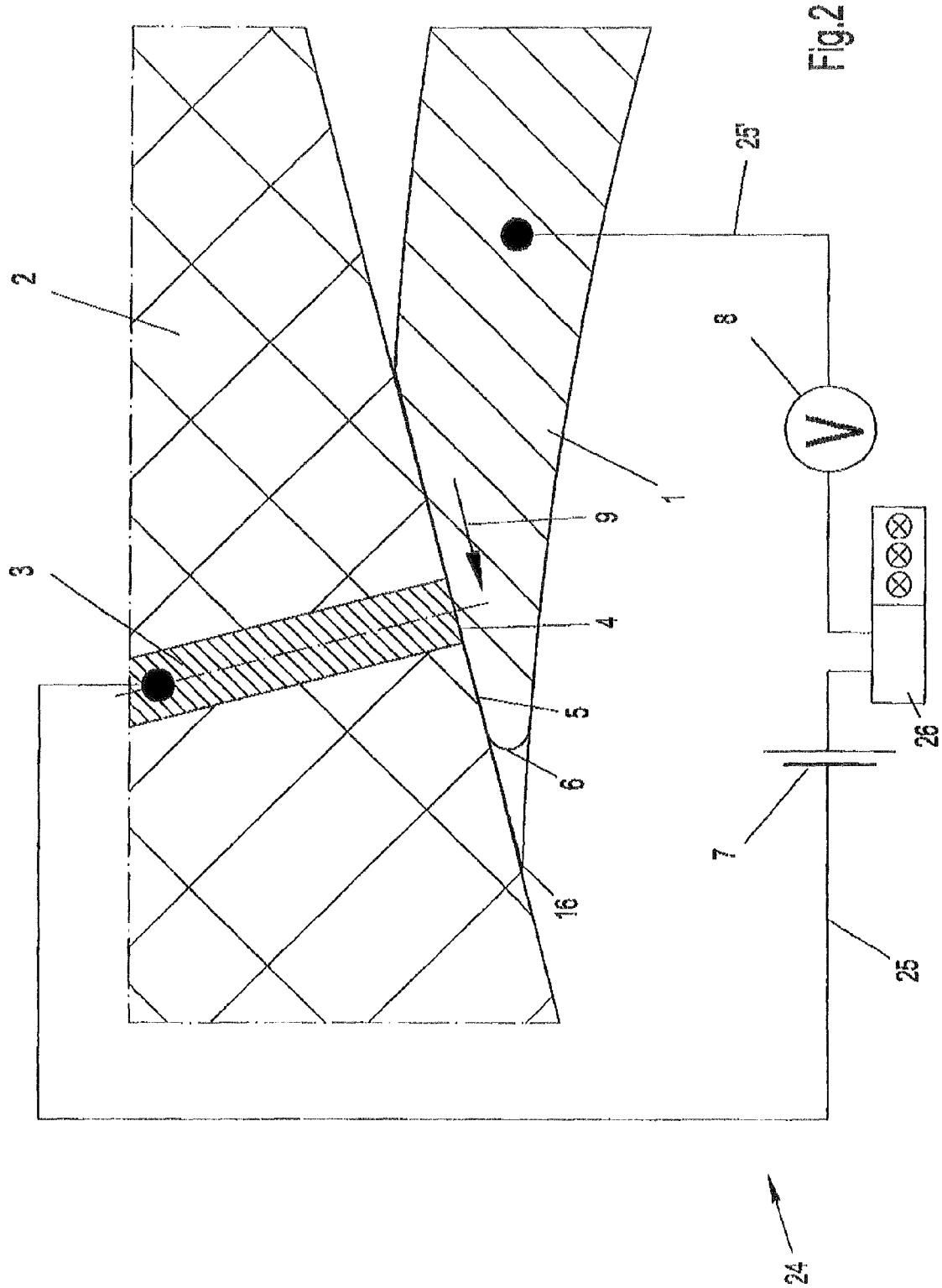

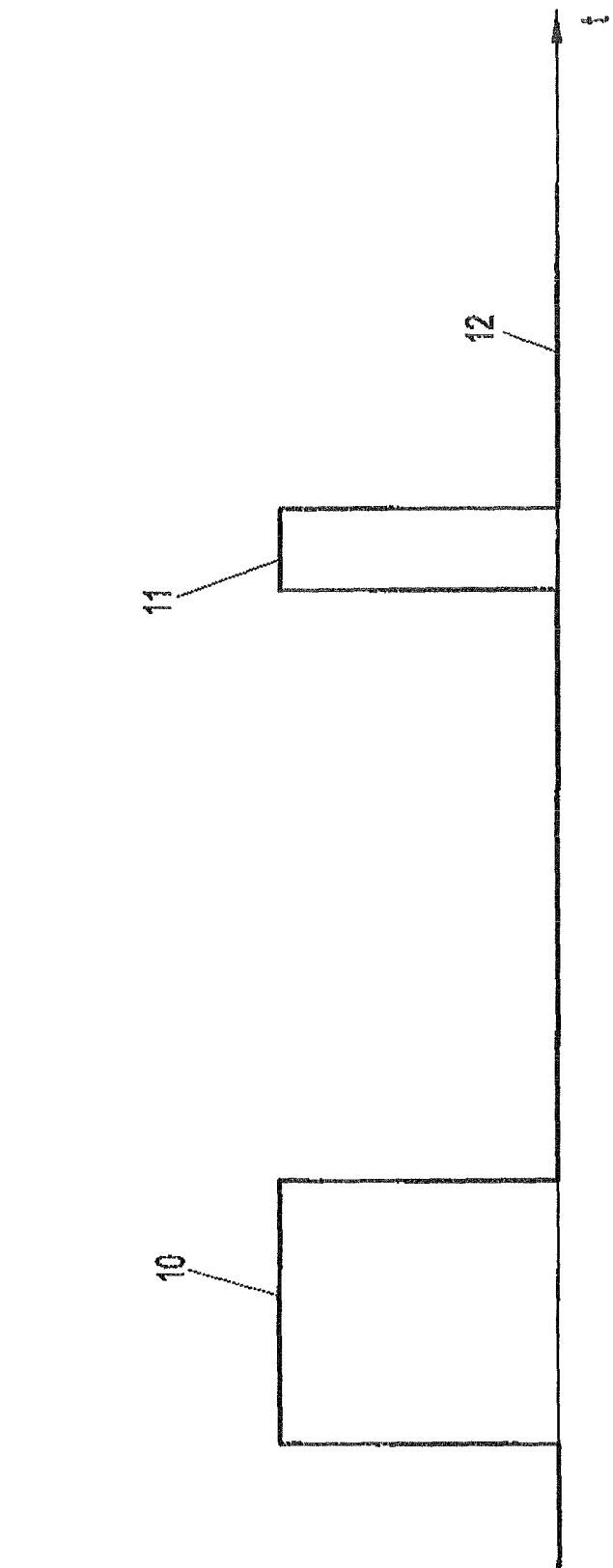

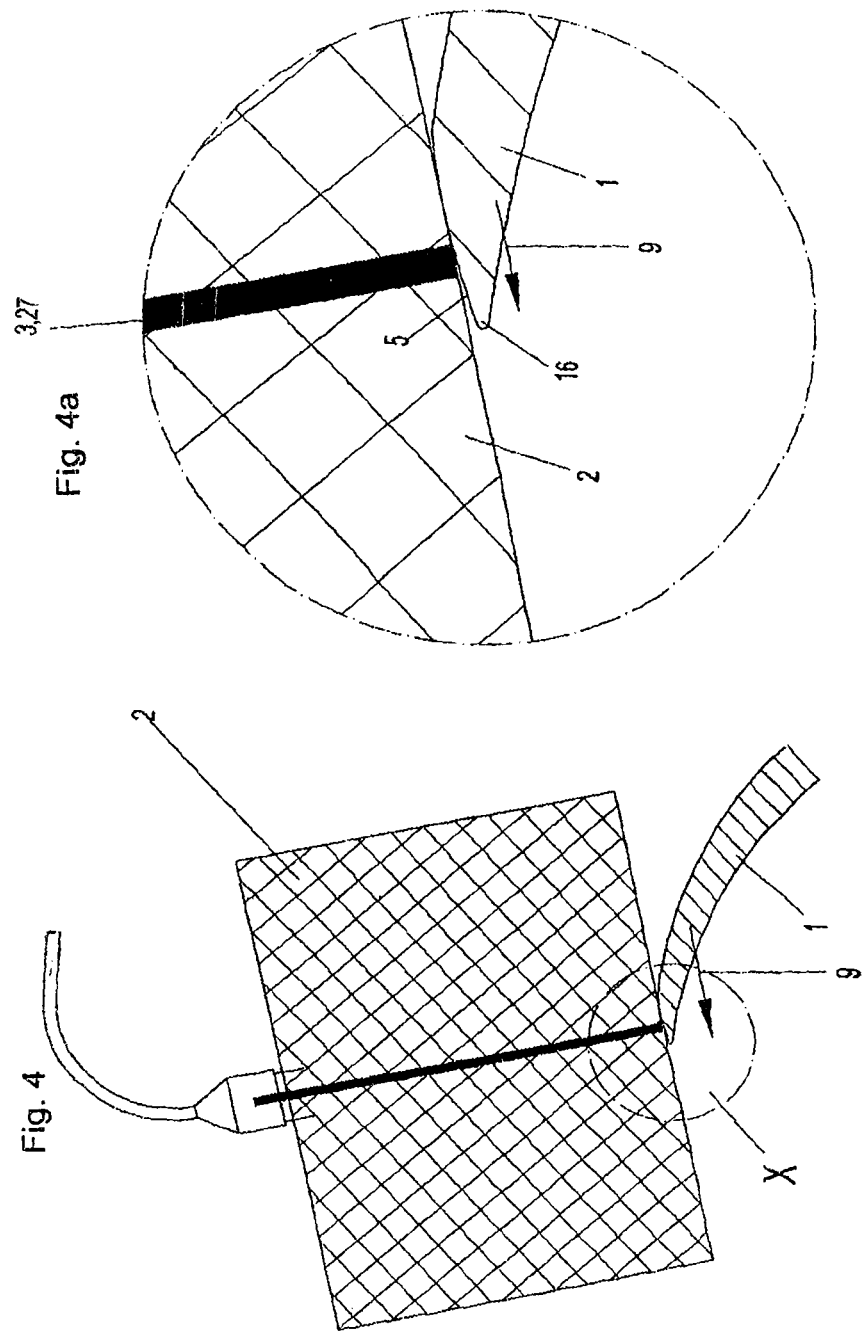

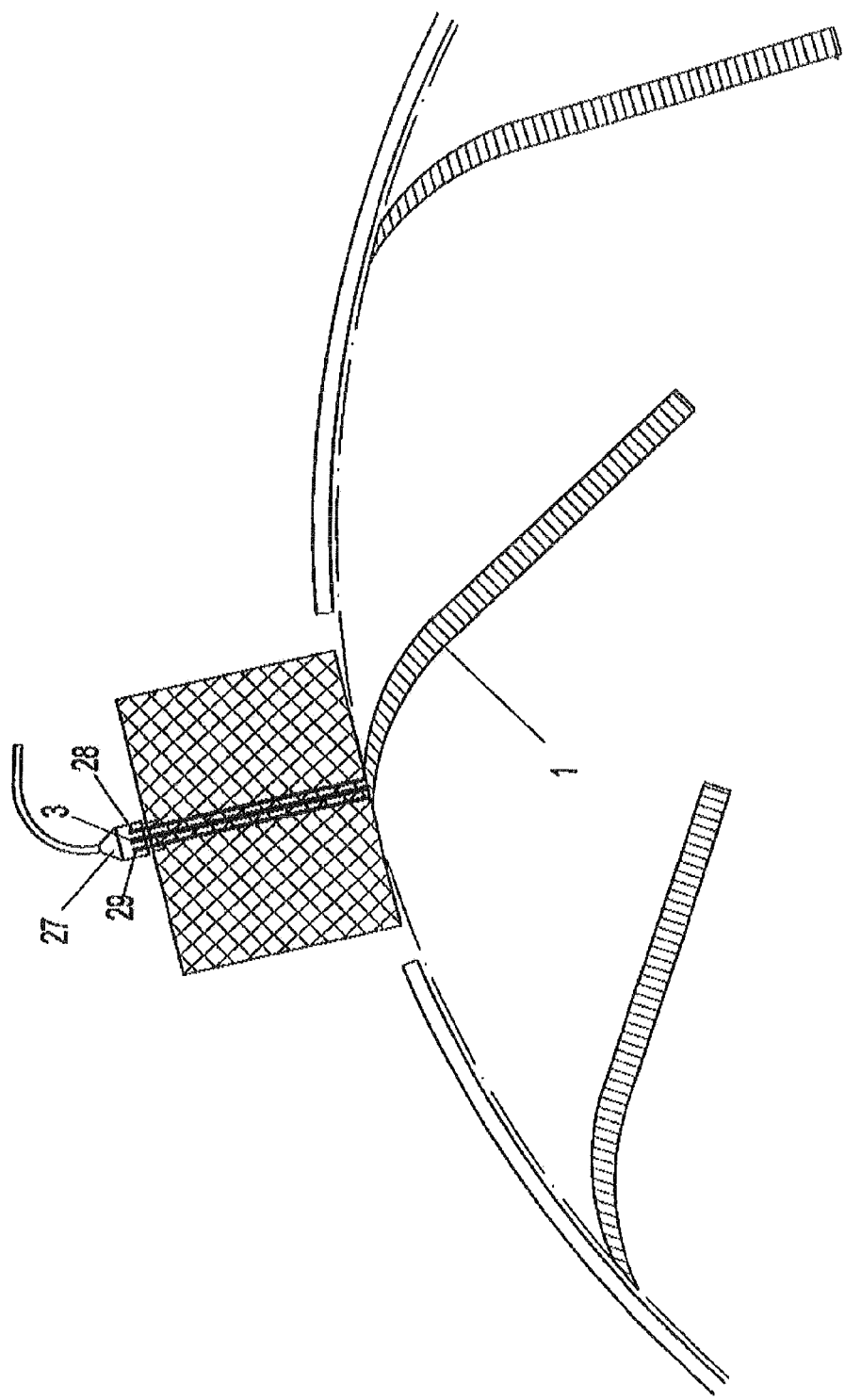

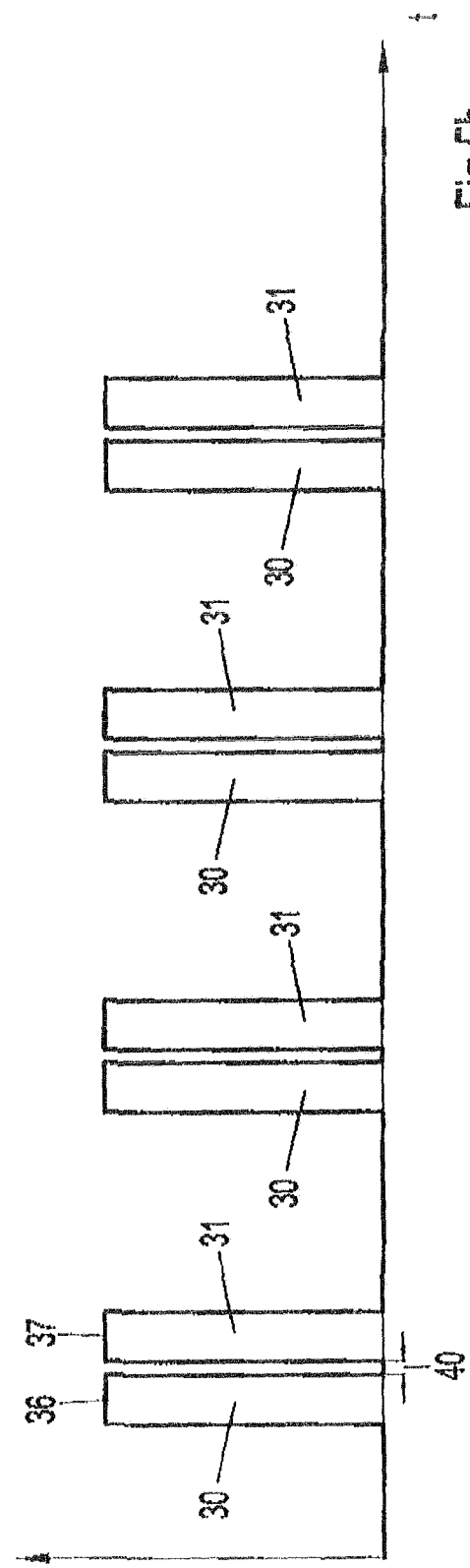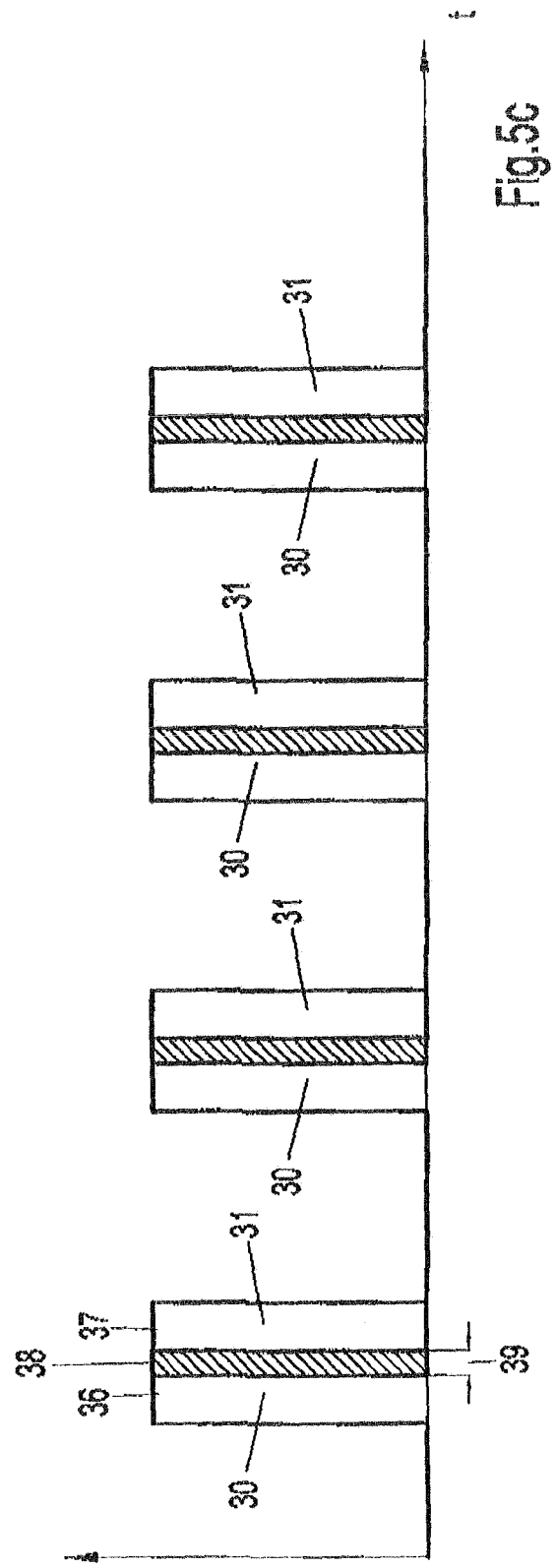

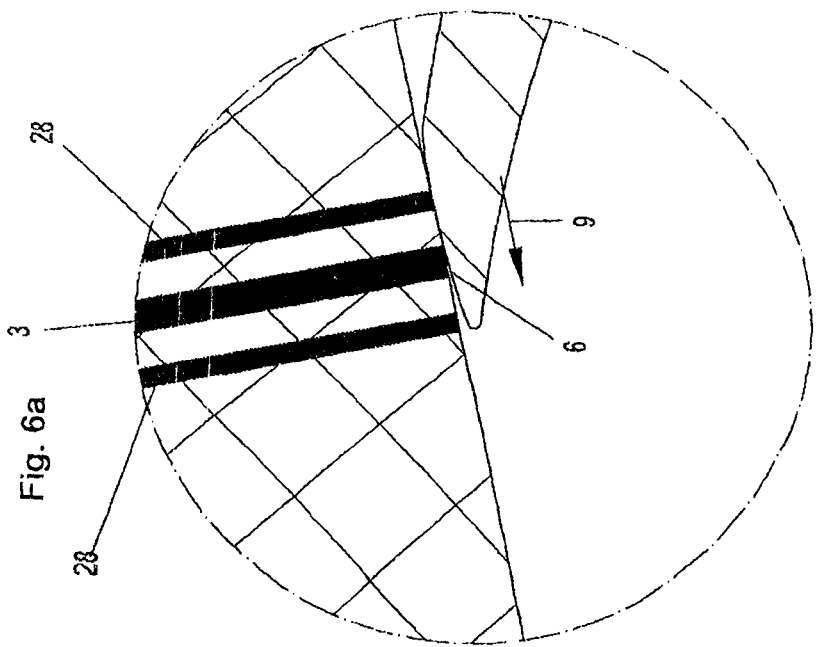
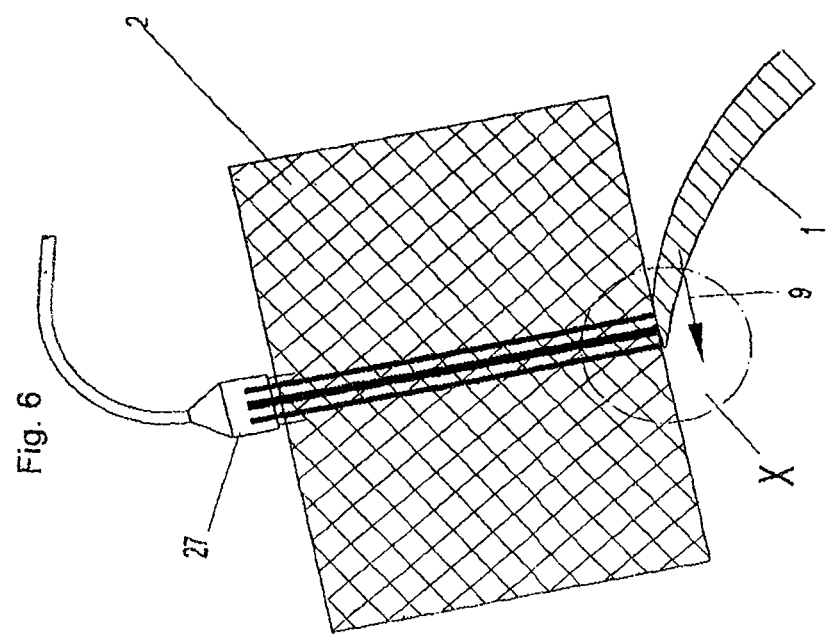

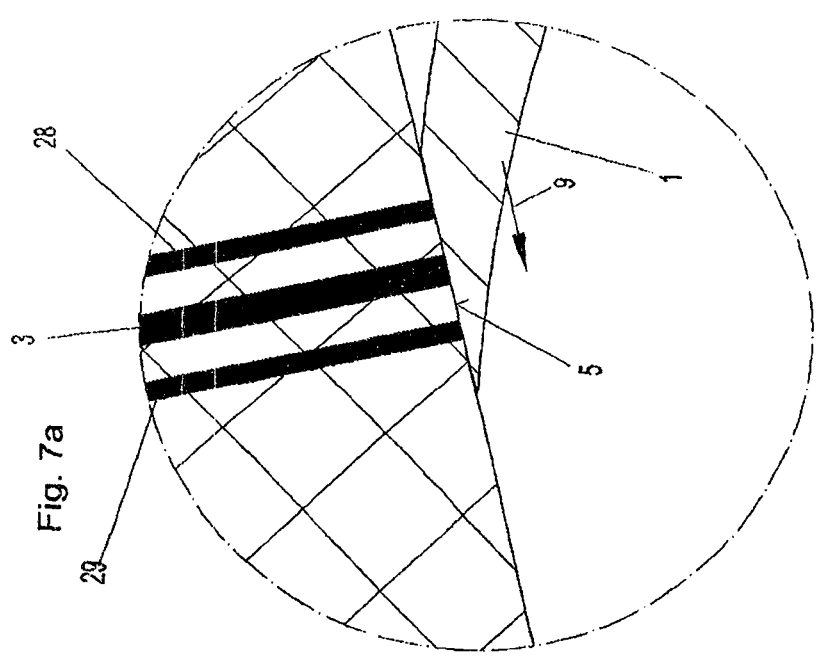
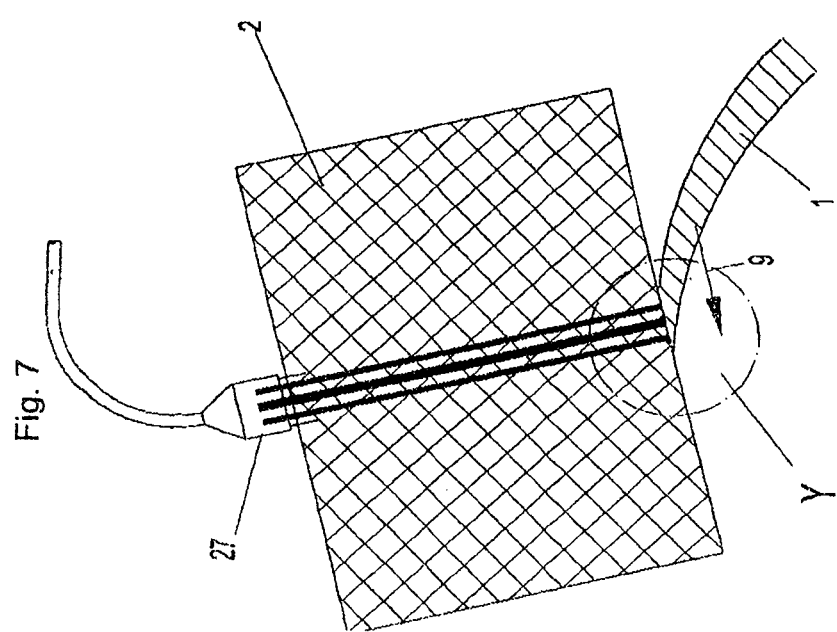

METHOD FOR DETERMINING THE SHARPNESS OF CUTTING EDGES OF CHOPPER BLADES

CROSS-REFERENCE TO A RELATED APPLICATION

The invention described and claimed hereinbelow is also described in German Patent Application DE 10 2011 102172.1, filed on May 21, 2011, and in German Patent Application 10 2011 055851.9, filed on Nov. 30, 2011. The German Patent Applications, whose subject matter is incorporated by reference herein, provide the basis for a claim of priority of invention under 35 U.S.C. 119(a)-(d).

BACKGROUND OF THE INVENTION

The invention relates to a method and a device for determining the sharpness of cutting edges of chopper blades at a rotationally driven chopper drum of a chopping assembly of a forage harvester, comprising a shear bar and a sharpening device having a sharpening stone for resharpening the chopper blades.

Document DE 10 2009 029 675 A1 discloses a device for determining the sharpness of chopper blades that can be moved with respect to a shear bar. The device comprises a sensor that directly or indirectly detects the effective cutting forces and an evaluation device connected to the sensor. The evaluation device integrates the measurement values of the sensor over time in order to generate information regarding the sharpness of the chopper blades. The basic idea is that blade wear correlates with the integral with respect to time of the cutting forces or the cutting energy. Therefore, a quantity that is dependent on the cutting forces that are effective while the crop is being chopped is measured by way of the sensor and a signal that is dependent on the quantity is integrated as a function of time by an evaluation device in order to generate information on the sharpness of the chopper blades.

It is a very difficult undertaking, however, to determine the cutting forces at a rotating chopper drum in the presence of very different loads, with sufficient accuracy, due to the continuous fluctuations of the throughput of mass.

SUMMARY OF THE INVENTION

The present invention provides a conditioning device and agricultural harvesting machine that overcome shortcomings of the known arts.

The invention overcomes shortcomings arising from performing a direct or indirect determination of the cutting forces, as is known, by instead actually detecting and evaluating the sharpness of cutting edges of the chopper blades.

The invention provides a device for detecting the sharpness of cutting edges of chopper blades of a chopper drum of an agricultural harvesting machine in order to operate the harvesting machine in the most energy-efficient manner possible and a simple and reliable method using the associated with the device.

In an embodiment, the invention provides a method for determining the sharpness of cutting edges of chopper blades at a rotationally driven chopper drum of a forage harvester, comprising a shear bar and a sharpening device having a sharpening stone for resharpening the chopper blades. The method includes scanning a blade surface of at least one chopper blade located behind the cutting edge by at least one electrode, the scanning occurring as the contact sensor and the duration of contact of the at least one electrode with the blade surface is determined.

The sharpness of a blade surface is deduced on the basis of the duration of contact of the at least one electrode with the blade surface since the detectable contact duration diminishes according to the wear that occurs to the blade surface during operation of the chopper blades. The invention makes it possible to deduce the sharpness of the chopper blades.

A shearing cutting device comprising a blade having a cutting edge and a shear bar and an optimal cutting gap is geometrically configured in such a way that, due to the sharpening procedures, the blade surface behind the cutting edge has the same angular orientation as the direction of motion of the blade itself. This is the radius of the cutting cylinder when the cutting device is rotating. A sharpened blade having a minimal radius of the front cutting edge therefore has the largest possible straight blade surface. If the cutting edge as well as the back of the blade becomes worn due to cutting processes, the straight portion of the blade surface shortens since the blade surface becomes rounded due to wear. The straight portion of this blade surface is determined by moving the contact sensor toward this blade surface in a targeted manner. This takes place by evaluating the length of the contact period.

Advantageously, the at least one electrode is moveable in an axial direction of the chopper drum to permit comprehensive scanning of the cutting edge of the chopper blade.

In particular, the at least one electrode and the chopper blades are connected to a current source and form an electric circuit that remains closed for the duration of contact of a chopper blade with the electrode. In this variant, the at least one electrode and the chopper blade form the switch that closes the electric circuit for the duration of contact.

To compensate for the influences of blade speed, this speed must be known or determined using a suitable device. The sharpness state of the cutting edges is determined by comparing the speed-compensated blade surfaces between the value for "sharp" and the actual value that is measured.

The value for the state of a sharp blade that is required therefor is measured directly after a sharpening procedure and is stored as the comparative value. Chopper blades are usually shaped in such a way that they have a wedge-shaped geometry. As a result, the comparative value for the state "sharp" is not constant and, instead, will continuously increase slightly due to sharpening procedures that are carried out. This comparative value is therefore re-determined and stored after every sharpening procedure.

The measurement procedure for determining the actual blade surface is initiated and evaluated at certain intervals within the working period of the cutting device. The result is an increasingly diminishing value for the duration of contact with the blade surface. Previously determined comparative values can be used to determine the sharpness state of the cutting edge, which is then communicated to the operator.

If the number of blades on the cutting cylinder is known in the case of a rotating cutting device, the sharpness state is allocated to each individual blade by utilizing additional information on the angle of rotation of the cutting cylinder relative to the blade position.

Furthermore, if the electrical contact is moved across the width of the cutting cylinder and the corresponding width position is determined while the measurement is carried out, a complete three-dimensional depiction of the sharpness state of the entire cutting cylinder is determined.

If the blades are disposed at a slant on the cutting cylinder, knowledge of the width position is utilized to compensate for this slanted position in the measurement.

To determine the straight blade surface, the contact sensor in the form of an electrode must have direct contact therewith. This requires that this electrode be positioned exactly. Advantageously, this electrical contact is disposed at the sharpening device for the blades. If a suitable contact material for the electrode is selected, it can be installed directly in the sharpening stone. The electrode therefore is always at the correct distance from the cutting surfaces, and a separate mechanical holding and readjusting device for the electrode is eliminated.

By integrating the electrode in the grinding stone, it is possible to utilize the sharpening device to detect the entire blade width of the cutting cylinder without further mechanical outlay. It is only necessary to provide information on the current position of the electrode. This is carried out, for example, using a displacement sensor or ascribing the sharpening motion according to time.

When only one electrode is used, the electric circuit is temporarily closed by contact with the particular chopper blade, as described above. To this end, the rotating chopper drum rests against the voltage source of the electric circuit by way of a slipring contact.

In a further embodiment of the invention, the entire chopper drum is not incorporated in the electric circuit to thereby eliminate the slipring contact, which would then be required. This primarily ensures that the measurement technique is highly robust with respect to external disturbing influences. At least two electrodes are disposed in or at the sharpening stone, namely a leading electrode and a trailing electrode.

In a further embodiment of the invention, a third, central electrode and, separate therefrom, a leading electrode and a trailing electrode, are likewise disposed at or in the sharpening stone. These electrodes basically take part in the abrasive process of the post-grinding.

In the embodiment comprising three electrodes, electric voltage potential is always present at the central electrode. If the chopper blades are in the fully sharpened state, when the chopper drum rotates, all three electrodes rest momentarily on the sharpened blade surface of the chopper blade as soon as a chopper blade comes into contact with the sharpening stone. Since this process takes place in milliseconds due to the rotating motion, the chopper blades act as a normally open contact and, by nature, as passing contacts between the current-carrying central electrode and the leading and trailing electrodes.

If both passing contacts, which is to say, that of the leading electrode and that of the trailing electrode, are briefly closed, two superposed voltage pulses are generated. These voltage pulses are utilized as indicators for a fully sharpened blade. Since, as wear increases, the sharpened blade surfaces of the chopper blades become larger and, therefore, wider, it is possible to misinterpret the pulse length of the measurement values. Such misinterpretation is counteracted by storing the pulse sequence and contact duration that were recorded in the most recent sharpening procedure in the memory of a p-controller, which is equivalent to a permanently updated reference.

It can therefore be determined that at least one contact sensor or at least one electrode is continuously connected to a voltage source in the operating state and takes part in the abrasive sharpening process.

If the cutting surfaces of the chopper blades contact the sharpening stone in the rotating state of the chopper drum, and therefore every passing chopper blade briefly acts as a passing contact and closes the electric circuit for the duration of the contact, an electric pulse is generated by way of the momentary current flow. As a result, current flow is generated for the duration of the contact. This current flow is registered using measurement technology and can be depicted visually. This applies analogously for the interruption of contact, the duration of which is likewise registered using measurement technology and to which a pulse duration is ascribed and which is incorporated in the evaluation of the sharpness.

The resulting pulse durations are utilized, in combination with an evaluation algorithm of a p-controller, to deduce the sharpness of the cutting edges of the chopper blades. The sharpening stone and the at least one electrode thereof, in entirety, also serve as the sensor for determining the sharpness state of the chopper blades. The measurement device is therefore also a component of the sharpening device in entirety, enabling monitoring all chopper blades of the entire chopper drum in the circumferential radial extension and the axial extension thereof with respect to the sharpness thereof during the sharpening process.

As a result, the sharpness state of the entire cutting cylinder is registered in real time using measurement technology and is visualized in the form of graphic symbols. This measurement device is furthermore utilized to automatically shut off a sharpening procedure when it has reached the desired sharpness.

The sharpening and measurement procedure is started manually or, alternatively, automatically by way of shunting maneuvers that take place at the end of a field.

It is particularly advantageous that the inventive sharpening process is not based merely on suspicion of inadequate sharpness of the chopper blades, but rather on actual measurements. This extends the service life of the sharpening stone as well as the service life of the chopper blades. Extending the service life is a considerable contribution to the improvement of the cost effectiveness of such a harvesting machine.

Further details will become apparent from the exemplary embodiment depicted in the following. The invention is explained in greater detail in the following with reference to an example.

BRIEF DESCRIPTION OF THE DRAWING FIGURES

Further features and advantages of the invention will become apparent from the description of embodiments that follows, with reference to the attached figures. Shown are:

FIG. 2 is a schematic view of a measurement system of the invention;

FIG. 3 is a graph depicting sharpness information;

FIG. 4 depicts a contact sensor and chopping blade in a state with a greatly worn cutting edge;

FIG. 4a depicts an enlargement of detail X of FIG. 4;

FIG. 5 depicts an embodiment of a contour sensor according to the invention;

FIG. 5b shows an example of the course with respect to time of the duration of the closure of the passing contact switches according to an embodiment of the invention as shown in FIG. 6;

FIG. 5c shows an example of the course over time of the closing durations of the passing contact switches according to an embodiment of the invention as shown in FIG. 7;

FIG. 6 depicts a contact sensor and chopping blade;

FIG. 6a shows the enlargement of the detail X in FIG. 6;

FIG. 6 depicts a contact sensor and chopping blade;

FIG. 7 depicts a contact sensor and chopping blade; and

FIG. 7a shows the enlargement of the detail X in FIG. 7.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit 8nd scope of the present invention, as defined by the appended claims.

Figure 1:
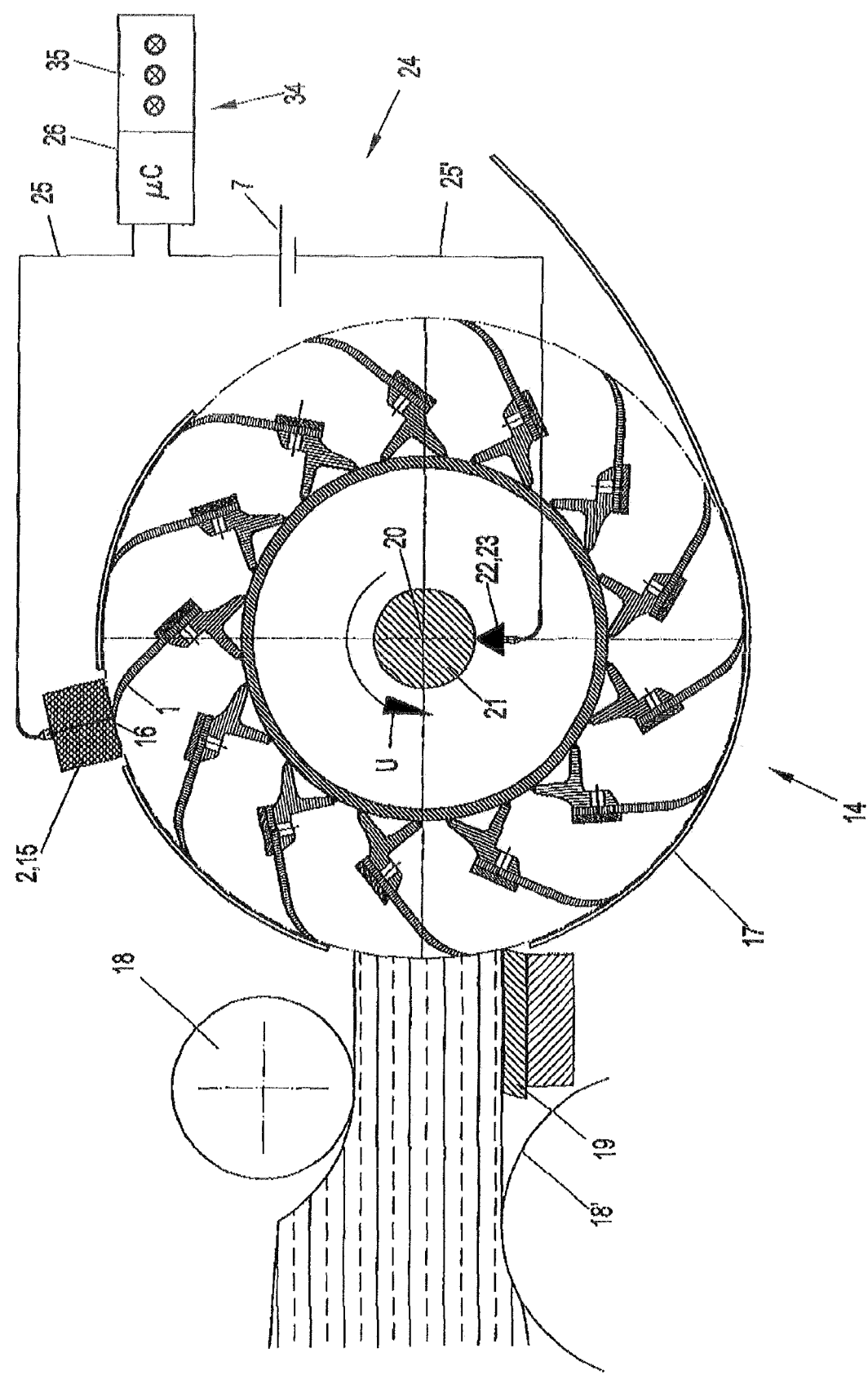
FIG. 1 is a schematic depicting one embodiment of a device of the invention.

FIG. 1 shows cross-sectional view simply depicting a basic design of a chopper drum 14 comprising chopper blades 1 thereof and a sharpening device 15 according to the invention. The sharpening device is for resharpening the cutting edges 16 of the chopper blades 1. The function and design of a chopper unit of a forage harvester is known to a person skilled in the art, and therefore a simplified depiction is sufficient here for explaining the invention.

The chopper drum 14 is supported in the side walls of the chopper housing 17 in a known manner and has a drive connection with the motor of the self-propelled forage harvester. The rotational motion in the operating state is labeled with the direction-of-rotation arrow U. Installed upstream of the chopper drum 14, in a known manner, are the compression rollers 18, 18' and the stationary shear bar 19.

The chopper unit comprises a sharpening device 15 for resharpening the chopper blades 1. The sharpening device 15 is depicted symbolically by a sharpening stone 2. The sharpening stone 2 is moveable toward the chopper drum 14 in the radial direction. At the same time, the sharpening stone 2 is moveable parallel to the rotational axis 20 of the chopper drum 14. At least one contact electrode 3 is disposed at or in the sharpening stone 2 for resharpening the chopper blades 1. Contact electrode 3 serves as a contact sensor 27 for scanning the blade surface 5 of the chopper blades 1 located behind the cutting edge 16.

In the exemplary embodiment shown, the electrode 3 and the entire chopper drum 14 are connected to an electric current source 7. The electric current source 7 is depicted as an electrically chargeable battery as an example, having the potential difference V and the electric voltage V, which are part of a measurement system 24. The shaft 21 of the chopper drum 14 comprises a slipring element 22, against which a current collector 23 rests. The slipring element 22 establishes contact with the chopper drum 14. A μ-controller 26 is incorporated into the design of the measurement system 24. The μ-controller 26 comprises the electric current source 7, the electric leads 25, 25', the electrode 3 and the current collector 23, wherein the current flow within the electric current source 7 is an input signal for the μ-controller 26.

If the chopper blades 1 impact the electrode 3 during resharpening while the chopper drum 14 rotates, the electric current source 7 is closed in this instant and remains closed for the duration of contact between the blade surface 5 of the chopper blade 1 and the at least one electrode 3 in the sharpening stone 2. For this short instant, the chopper blade 1 itself acts as a passing contact for closing the electric current source 7.

FIG. 2 highlights the principle of an electric contour sensor 27 according to the invention, and FIG. 3 highlights shows one possible graph of the sharpness information.

The phase over time depicted in FIG. 3 shows the contact of a chopper blade 1 with the sharpening stone 2 and the electrode 3 integrated in the sharpening stone 2.

According to FIG. 2, a current 12 flows in the contact point 4 of the straight blade surface 5 comprising the electrode 3 via the electric current source that is connected to the chopper blade 1 and electrode 3. The current is detected in a suitable evaluation device 8. By way of suitable methods, the evaluation device 8 eliminates a possible occurrence of contact flutter at the contact point 4. Moreover, a plurality of measurement values is statistically processed to obtain a reliable sharpness value.

The blade surface 5 moves at a speed in a direction 9 that is identical to the circumferential motion U of the chopper drum 14, parallel to the electrode 3 and the sharpening stone 2. If the blade 1 has been sharpened, the straight portion of the blade surface 5 is as large as possible. In this case, the electric connection or the contact is sustained for a long duration 10.

If the cutting edge 16 of the blade 1 shows signs of wear, the cutting edge 16 has a larger cutting radius 6. The duration 11 of the electric contact in the contact point 4, which is established only on a short piece of the blade surface 5, becomes substantially smaller. The sharpness is deduced by way of comparison with the associated duration 10 for a sharpened chopper blade 1.

The blade sharpness value is output as a mean value for the entire chopper drum 14, for example, in the form of a traffic light or a numerical value.

If a sensor synchronizes the position of the chopper drum 14, which is to say, outputs a signal at a certain point of the chopper drum 14, the sharpness values is allocated to the individual chopper blades 1.

In addition, if the electrode position with respect to the drum width is known the sharpness values for the entire chopper drum 14 can be calculated in three dimensions. The electrode position is ascertained by a displacement sensor or allocation of a longitudinal motion of the sharpening stone 2 with respect to time. Moreover, knowledge of the position of the electrode 3 makes it possible to compensate for the practically common slanted position of the chopper blades 1 in the measurement procedure.

If the actual value of the duration 11 at which a chopper blade 1 is considered to be dull and therefore absolutely must be resharpened is known, for example, by way of previous practical testing, the operator can be requested to initiate sharpening when this value is exceeded. This request is communicated by way of the evaluation unit 34 of the display unit 35. For example, the information is visualized to the driver by a green, yellow or red signal display in the form of a traffic light.

If the operator then initiates a sharpening procedure, the sharpness value of the chopper blades 1 is continuously determined during these sharpening cycles using the electrode 3 integrated in the sharpening stone 2. If the connected evaluation unit 34 determines that the chopper blades 1 have reached the setpoint value for sharp blades, the sharpening device 15 automatically stops and prevents unnecessary sharpening of the chopper blades 1.

FIG. 4 shows a situation of a chopping blade 1 having a greatly worn cutting edge 16. FIG. 4a shows the detail X of Fig. in an enlarged depiction. The blade surface 5, which is the contact surface with the electrode 3, is curved to an extreme extent. As such, any contact results in a very short contact duration 11, whereby the μ-controller 26 reports that the cutting edge 16 or the chopper drum 14 absolutely must be resharpened or ground.

Figure 5A:
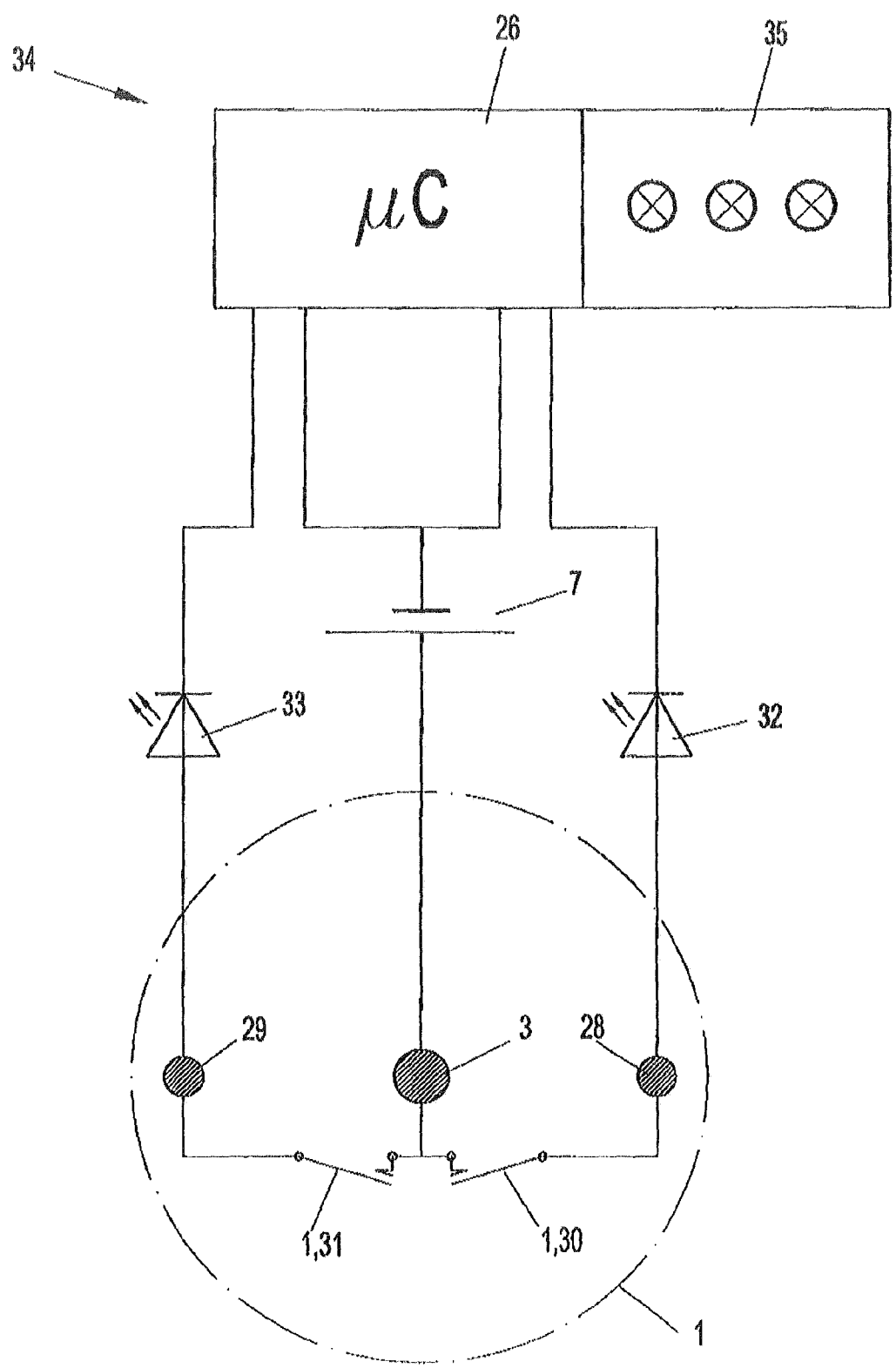
FIG. 5a is a schematic representation of an evaluation unit of the invention.

FIG. 5 shows a further embodiment of a contour sensor 27 according to the invention. At least three electrodes are embedded in the sharpening stone 2, namely a central electrode 3 (which is designed as described with reference to FIG. 2), a leading electrode 28 and a trailing electrode 29. All electrodes 3, 28, 29 are located in an electric current source 7 having a connected potential difference as shown in FIG. 5a. The electrodes 28 and 29 are connected in a parallel, wherein each of the two electrodes 28 and 29 are simultaneously connected in series to the central electrode 3.

Light-emitting diodes (LED) 32, 33 are installed in the meshed circuits as resistors or display elements. Both electric circuits, namely that between the central electrode 3 and the leading electrode 28 and that between the central electrode 3 and the trailing electrode 29, are equipped with a passing contact switch 30 and 31 and, in fact, are a normally open contact. The function of the passing contact switch 30, 31, which is designed as a normally open contact, is performed by the chopper blade 1 (as described with reference to FIG. 2). That is, the contacts are closed by the abrasive contact with the passing chopper blades 1 and, as soon as these contact closures have ended, the passing contact switches 30, 31 are reopened. These closing and opening times of the passing contact switches 30, 31, also are communicated to an evaluation unit 34. By evaluating the superposition times of these contact closures, inferences are drawn regarding the cutting sharpness state of the chopper blades 1 and are forwarded for visualization on the display unit 35 for informing the driver in the cab.

FIG. 5b shows an example of the course with respect to time of the duration 36, 37 of the closure of the passing contact switches 30, 31, according to the application shown in FIG. 6 and FIG. 6a. FIG. 6a shows the enlargement of the detail X in FIG. 6. FIG. 6 shows the exemplary application of the contour sensor 27 comprising three electrodes according to FIG. 5, the central electrode 3 and a leading electrode 28 and a trailing electrode 29, which are in contact with a substantially worn chopper blade 1. The course over time of the situation that is depicted according to Fig. is typical for substantially worn cutting edges 16 of the chopper blades 1 of a chopper drum.

FIG. 5b shows the sequences of durations 36, 37 of the passing contact switches 30, 31 at four successive chopping blades 1 over the course of one revolution of a chopper drum 14. A time gap 40 in which no current flows results between the closing duration 36 of the leading electrode 28 and the closing duration 37 of the trailing electrode 29. This is due to the blade surface 5, which is substantially worn and curved. This time gap 40 delivers a clear indication to the evaluation unit 34 that the chopper blades 1 are substantially worn and the sharpening procedure should be implemented with the utmost urgency. The display unit 34 signals this to the driver, for example by illuminating a red light-emitting diode.

FIG. 5c shows the course over time of the closing durations 36, 37 of the passing contact switches 30, 31, according to the embodiment in FIG. 7 and FIG. 7a. FIG. 7a shows the enlargement of the detail X according to FIG. 7. FIG. 7 shows the exemplary application of the contour sensor 27 comprising three electrodes, the central electrode 3 and a leading electrode 28 and a trailing electrode 29, which are in contact with a sharp chopper blade 1. The course over time of the situation that is depicted is typical for sharpened cutting edges 16 of the chopper blades 1 of a chopper drum.

The FIG. 5c depiction shows the sequences of the closing durations 36, 37 of the passing contact switches 30, 31 at four successive chopping blades 1 over the course of one revolution of the chopper drum 14. A time superposition 38 in which current flows through all electrodes 3, 28, 29, results between the closing duration 36 of the leading electrode 28 and the closing duration 37 of the trailing electrode 39. This is due to the blade surface 5, which has been sharpened exactly and is not at all worn. This time superposition 38 delivers the clear indication to the evaluation unit 34 that the chopper blades 1 are in a sharp state. The display unit 35 signals to the driver, by illuminating a green light-emitting diode, for example, that resharpening is not required at this time.

The duration of the time superposition 38 approaches zero as the wear of the cutting edge 16 of the chopper blade 1 increases. By establishing a minimal threshold value for the duration of the time superposition 38, the evaluation unit 34 issues the control command to the display unit 35 to now illuminate the yellow light-emitting diode. Accordingly, the driver receives the information to implement the resharpening process or the sharpening process of the chopper blades 1 at the next opportunity.

The closing and opening times of the passing contact switches 30, 31 are therefore also fed to the evaluation unit 34. By way of the evaluation of the superposition times 39 of these contact closures, inferences are made regarding the cutting sharpness state of the chopper blades 1 and are displayed on the display unit 35 for information purposes and for visualization. That is, the information is made available to the driver in the cab.

The following list of reference signs of various elements mentioned above is included (as follows), for ease of explanation:

1 chopper blade
2 sharpening stone
3 electrode, contact electrode
4 contact point
5 blade surface
6 cutting radius
7 current source, electric circuit
8 voltmeter
9 direction
10 duration
11 duration
12 current
14 chopper drum
15 sharpening device
16 cutting edge
17 chopper housing
18, 18' compression rollers
19 shear bar
20 rotation axis
21 shaft
22 slipring element
23 current collector
24 measurement system
25, 25' electric leads
26 μ-controller 27 contour sensor
28 leading electrode
29 trailing electrode
30 passing contact switch
31 passing contact switch
32 LED light-emitting diode
33 LED light-emitting diode
34 evaluation unit
35 display unit
36 closing duration
37 closing duration
38 superposition
39 superposition time
40 time gap
U rotational motion
V potential difference (voltage)

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A method for determining a sharpness of cutting edges (16) of chopper blades (1) at a rotationally driven chopper drum (14) of a forage harvester, comprising a shear bar (19) and a sharpening device (15) having a sharpening stone (2) for resharpening the chopper blades (1), comprising steps of:
   scanning a blade surface (5) of at least one of the chopper blades (1) located behind a cutting edge (16) thereof by at least one electrode (3) disposed at the sharpening stone (2) of the sharpening device (15) and having direct contact with the blade surface (5), and
   using a measurement system (24), determining a duration of contact of the at least one electrode (3) with the blade surface (5).

2. The method according to claim 1, wherein the at least one electrode (3) is moved in and axial direction of the chopper drum (14).

3. The method according to claim 1, further comprising closing an electric circuit, formed by connecting the at least one electrode (3) and the chopper blades (1) to an electric current source (7), for the duration of contact of the at least one electrode (3) with the blade surface.

4. The method according to claim 3, further comprising determining, using the measurement system, a duration of electric current flow resulting from the closing of the electric circuit and feeding the duration to an evaluation unit (34) as an input signal.

5. The method according to claim 4, wherein measurement values for the electric current flow and/or the duration of the electric current flow are fed, as input signals, to a µ-controller (26) as part of the evaluation unit (34), and corresponding output signals from the µ-controller (26) provide a driver of the forage harvester with information on a sharpness state of the cutting edge (16) of the chopper blades (1).

6. The method according to any one of the claim 4, wherein measurement values of the electric current flow and the duration of the electric current flow are registered by the measurement system (24) and are fed to a µ-controller (26) as input signals, and corresponding output signals from the µ-controller (26) are used to control the sharpening device (15).

7. The method according to claim 1, wherein the at least one electrode (3) is energized by a current flow, wherein a magnitude and a duration of the current flow has a correlation to the sharpness of the cutting edge (16), and wherein the correlation is provided to a driver as information.

8. A device for determining a sharpness of cutting edges (16) of chopper blades (1) at a rotationally driven chopper drum (14) of a forage harvester, comprising a shear bar (19) and a sharpening device (15) having at least one sharpening stone (2) for resharpening the chopper blades (1), comprising:
   at least one electrode (3) configured as a contour sensor (27) for scanning a blade surface (5) of at least one of the chopper blades (1) located behind a cutting edge (16), the at least one electrode (3) disposed at the at least one sharpening stone (2) of the sharpening device (15) and having direct contact with the blade surface (5); and
   a measurement system (24) for detecting a cutting edge sharpness of chopper blades (1);
   wherein the measurement system (24) determines a duration of contact between the chopper blade (1) and the at least one electrode (3).

9. The device according to claim 8, wherein the at least one electrode (3) is adjustable in a radial direction.

10. The device according to claim 8, wherein the measurement system (24) comprises an electric current source (7), the at least one electrode (3), the chopper blade (1) and a measurement device (8).

11. The device according to claim 10, wherein the measurement system (24) determines the duration of contact as a function of a current flow in the electric current source (7).

12. The device according to claim 10, wherein the measurement system (24) comprises an evaluation unit (34) having a µ-controller (26), wherein input signals from the measurement system are provided to the µ-controller (26) and are used to generate information for a driver regarding the cutting edge sharpness of the chopper blades (1).

13. The device according to claim 8, wherein the contour sensor (27) further comprises at least one of a leading electrode (28) or a trailing electrode (29).

14. The device according to claim 8, wherein the contour sensor (27) further comprises a leading electrode (28) and a trailing electrode (29).

* * * * *